(12) United States Patent
Yoon

(10) Patent No.: US 6,180,152 B1
(45) Date of Patent: Jan. 30, 2001

(54) PROCESS FOR MANUFACTURING COMPRESSION-MOLDED CANDY

(75) Inventor: Seung Hong Yoon, Seoul (KR)

(73) Assignee: Jeong Woo Confectionery Co., Ltd. (KR)

( * ) Notice: Under 35 U.S.C. 154(b), the term of this patent shall be extended for 0 days.

(21) Appl. No.: 09/401,759

(22) Filed: Sep. 23, 1999

(30) Foreign Application Priority Data

Sep. 25, 1998 (KR) .................................................. 98-39886

(51) Int. Cl.⁷ ....................................................... A23G 3/00
(52) U.S. Cl. ........................................... 426/512; 426/660
(58) Field of Search ..................................... 426/512, 515, 426/660, 516

(56) References Cited

U.S. PATENT DOCUMENTS 5,443,856  *  8/1995  Akutagawa et al. .................. 426/515
5,705,217  *  1/1998  Aasted ................................. 426/515

* cited by examiner

*Primary Examiner*—George C. Yeung
(74) *Attorney, Agent, or Firm*—Needle & Rosenberg, P.C.

(57) ABSTRACT

The present invention provides a method for manufacturing compression-molded candy comprising the steps of mixing and dissolving conventional candy mixture at a temperature of 100 to 120° C., concentrating the candy mixture to a water content of below 2.0% under the conditions of a temperature of 130 to 160° C., steam pressure of 4.0 to 9.5 kgf/cm³, and vacuum pressure of 100 to 700 mmHg, adding the conventional additives thereto, maintaining the candy mixture at a temperature of below 80° C., and molding the candy mixture by pressure packing at a pressure of 10 to 50 kgf/cm³ within 5 to 30 seconds. By lowering the ratio of water content to below 2% and pressure packing the mixture at high pressure and low temperatures, it is possible to manufacture candies of various distinct shapes stable despite changes in the outer environment.

4 Claims, 1 Drawing Sheet

PROCESS FOR MANUFACTURING COMPRESSION-MOLDED CANDY

BACKGROUND OF THE INVENTION

1. Field of the Invention

This invention relates to a process for manufacturing compression-molded candy. More particularly, it relates to a process for manufacturing candy of various distinct shapes by a process which is a combination of the manufacturing process of conventional molded candy and that of depo candy.

2. Description of the Prior Art

In general, candy is classified according to the manufacturing process thereof into molded candy and depo candy.

Firstly, molded candy is prepared by the following process.

Various raw materials used in candy mixture, such as sugar, starch syrup and the like are dissolved in a dissolving bath with water, and the resulting mixture is concentrated by heating under vacuum in a vacuum concentrator to a water content of 3% or less. Thereafter, in a cooling zone various additives, such as flavouring, colouring agent, emulsifying agent, a sour taste agent and the like, are added to the above concentrated mixture, and then this mixture passes through a batch roller and a size roller to form candy rope of suitable thickness for molding. The above rope shaped candy mixture which has passed through a size roller, is engaged to form candy with a mold of a particular shape, and then the molded candy is cooled through a cooling tunnel.

Secondly, depo candy is prepared as follows.

The candy mixture is prepared by being dissolved in a dissolving bath and then concentrated in a vacuum concentrator according to the same process as the above molded candy. but with the water content of the depo candy maintained at 4.5% or less which is higher than that of the molded candy. This is because in the event that the candy mixture is excessively concentrated, difficulty is experienced in depositing the mixture from the hopper onto the mold due to the increased viscosity of the mixture, and the above mixture does not spread out evenly on the mold. The above mixture is then passed through a tube whilst various additives are added to it and it is collected into the hopper. Candy is formed by the depositing method by which the candy mixture(in syrup form) collected in the hopper is put into the candy mold in set quantities through the nozzle of the hopper, and the formed candy is cooled and then taken out from the mold. As a result of this process, the depo candy is obtained.

Molded candy, made as above, with a water content of about 2% to 3% has low fluidity. Therefore, if the temperature falls below 80° C., the molded candies are not formed clearly at the time of shaping in the mold, and if the temperature of the candy mixture is raised to prevent the above problem the problem of the deformation of the shape and pattern of the mixture occurs during the cooling process following molding. In addition to these problems, since the mixture has a comparatively high viscosity the mixture does not spread well and the manufacture of candy having distinct shapes in the mold is prevented.

Furthermore, depo candies made by putting the mixture from the hopper into the mold through a nozzle at a temperature of 140° C. to 150° C., have a water content of 2.2% to 4.5%, so the mixture is more fluid than molded candies, and its spreading property within the candy mold is excellent and thus it is possible to prepare candy which corresponds to the shape of the candy mold. However, there is the problem that the contents of the candy may melt or change shape easily during the distribution process due to the outer temperature or humidity due to the high ratio of water content of the candy mixture.

SUMMARY OF THE INVENTION

The present invention provides a process for manufacturing compression-molded candy, which does not melt nor change shape during the distribution process by reducing the water content in the candy mixture to below 2% and which overcomes the difficulty in molding the candy due to high viscosity owing to the low water content in the candy mixture by packing the candy mixture into the mold under strong pressure of 10~15 kgf/cm$^3$ at a low temperature. Further objects of the present invention are to provide compression-molded candy with a distinct shape which is stable despite changes in the outer environment.

The present invention provides a method for manufacturing compression-molded candy comprising the steps of mixing and dissolving conventional candy mixture at a temperature of 100 to 120° C., concentrating the candy mixture to a water content of below 2.0% under the conditions of a temperature of 130 to 160° C., steam pressure of 4.0 to 9.5 kgf/cm$^3$, and vacuum pressure of 100 to 700 mmHg, adding the conventional additives thereto, maintaining the candy mixture at a temperature of below 80° C., and molding the candy mixture by pressure packing at a pressure of 10 to 50 kgf/cm$^3$ within 5 to 30 seconds.

BRIEF DESCRIPTION OF THE DRAWING

The present invention is described further hereinafter with reference to the accompanying drawing, in which.

DETAILED DESCRIPTION OF THE PREFERRED EMBODIMENTS

Figure 1:
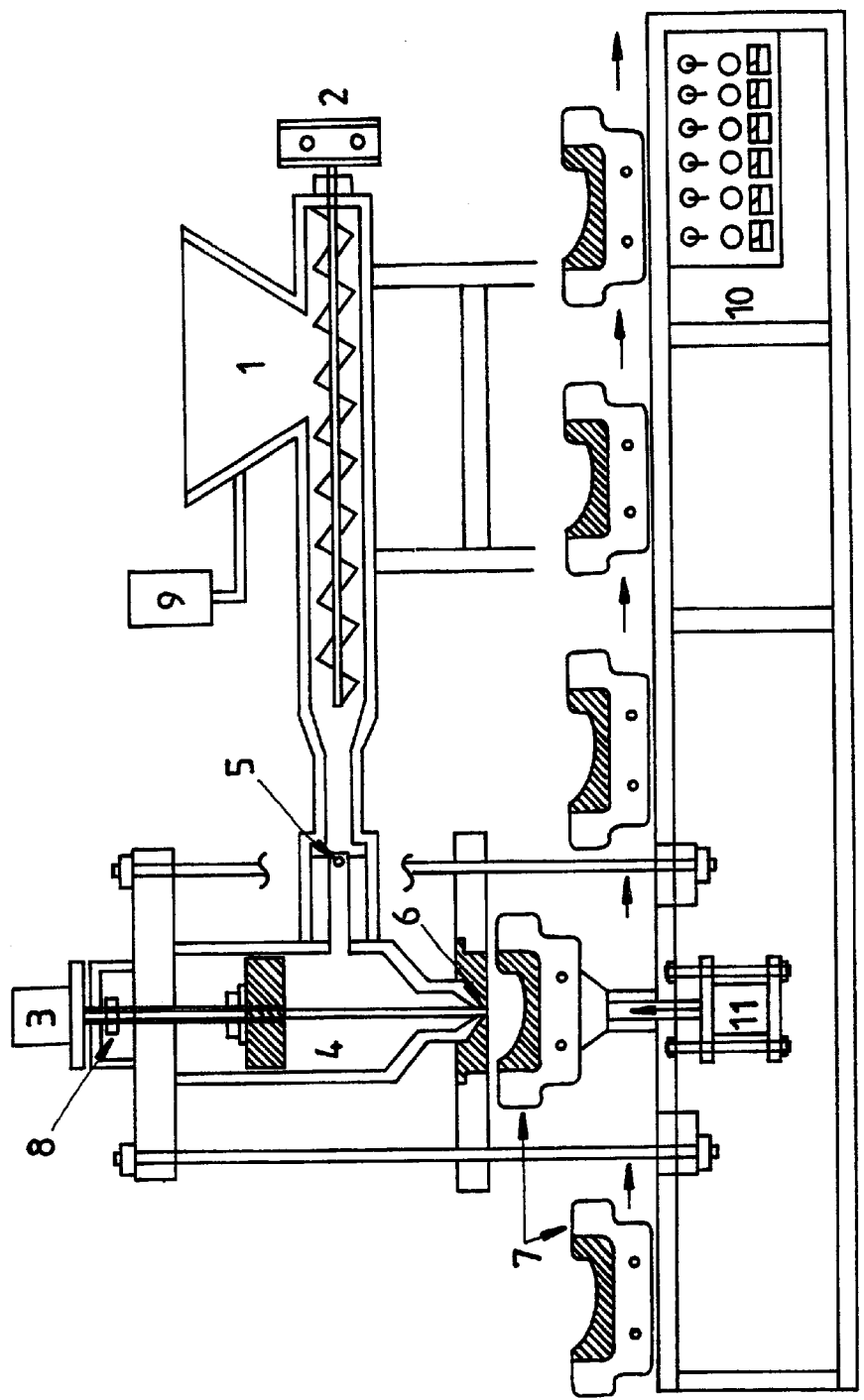
FIG. 1 is a schematic view of an embodiment of an apparatus according to the present invention.

A compression-molded candy according to the present invention can be prepared with a device designed for the present invention.

First. the conventional raw materials of candy mixture, such as sugar, starch syrup and water are put in a dissolving bath, mixed and dissolved completely at a temperature of 100 to 120° C. To make the dissolved mixture obtained from the above into syrup, the said mixture is concentrated to a state of water content of below 2% under the conditions of a temperature of 130 to 160° C., steam pressure of 4.0 to 9.5 kgf/ cm$^3$, and a vacuum pressure of 100 to 700 mmHg.

Although it is possible to simply lower the ratio of the water content in the candy mixture to below 2% in manufacturing conventional molding candy and depo candy, this preparation method has not been adopted since in the manufacturing method of the conventional candy, the viscosity of the candy is so high that when molding it does not conform to the mold frame, the shape of the candy is not clear and there is the possibility of marks forming which do not conform with the shape of the mold. Moreover, in the manufacturing method of the depo candy it is difficult to deposit the candy mixture in the mold from the hopper through nozzles owing to the high viscosity of depo candy and also the deposited candy mixture does not spread easily.

According to the present invention, candy mixture, the water content of which is concentrated below 2%, is mixed with conventional additives such as flavouring, colouring agent, a sour taste agent, and subsequently the above candy mixture is put into the hopper 1 which is similar to the one used in manufacturing depo candy. In this hopper, the candy mixture is maintained at a temperature of below 80° C. at least up to the point that it does not harden. However, it is difficult to make candy using the conventional manufacturing method of molding candy or depo candy at temperatures of below 80° C. with such candy mixture having high viscosity and with a ratio of water content below 2%, in particular, it is almost impossible to make candy with a clear shape.

The temperature of the above hopper can be regulated by a temperature control device 9 installed on the hopper 1.

In accordance with the process of the present invention, the candy mixture which is put in the hopper and maintained at a temperature of below 80° C. is transferred by force to a nozzle having an anti-inverse current check-ring 5 by a hydraulic rotation cylinder 2, and then pushed through to the inner part of the mold connected to the hydraulic piston 3 through the nozzle. The inner temperature of the above hydraulic rotation cylinder is maintained at 70 to 90° C. and the temperature of the nozzle is kept within 90 to 120° C.

The said candy mixture pushed into the inner part of the mold is packed with pressure into the mold 7 by extruding out of the mold within 5 to 30 seconds at the high pressure, for instance 10 to 50 kgf/cm$^3$ by a high pressure jacket type piston 4.

Since, according to the above process, the candy mixture is extruded under high pressure, there is no difficulty dropping the candy mixture into the mold 7 even though the viscosity of the mixture is high, and as the mixture spreads out on the mold easily it is possible to use not only molds for simple shapes but also molds for delicate shapes, for example animals'eyes, nose, mouth, feet and paws, or petal designs. Furthermore, stick candies can be made by the process of inserting sticks in the mold beforehand and then pressure packing candy mixture over them.

A product weight controller 3 capable of controlling the input of the mixture is mounted on the mold, and an opening and shutting system 6 is installed on the end of the mold to help such mold to extrude the mixture at high pressure.

The candies made as above are first cooled so that the surface thereof is cooled to a temperature of 40 to 50° C. while the temperature of the inside of the candy is actually 70 to 80° C. and then passed through a cooling tunnel on a conveyer belt and the said candies are then cooled for 3 to 5 minutes to complete the process under the conditions of a temperature of 20~35° C. and relative humidity of 50~55%.

The process of manufacturing compression-molded candy according to the present invention can prevent the contents therein from melting or changing shape due to changes in the outer environment by lowering the ratio of water content to below 2%, and overcomes difficulties in depositing the candy mixture into the mold and the problem that the shape of the molded candies are not clearly formed when molding in spite of the high viscosity of the mixture, by pressure packing the mixture at high pressure and low temperatures. Therefore, according to the present invention it is possible to manufacture candies of various distinct shapes which could not be made by the conventional method.

What is claimed is:

1. A process for manufacturing compression-molded candy comprising the steps of mixing and dissolving a candy mixture at a temperature of 100 to 120° C., concentrating the candy mixture to a water content of below 2.0% under the conditions of a temperature of 130 to 160° C., steam pressure of 4.0 to 9.5 kgf/cm$^2$, and vacuum pressure of 100 to 700 mmHg, wherein these conditions exist simultaneously, maintaining the candy mixture at a temperature of below 80° C., and molding the candy mixture by a high pressure jacket type piston at a pressure of 10 to 50 kgf/cm$^2$ within 5 to 30 seconds.

2. The process of claim 1 which further includes the step of adding a flavoring additive to the concentrated candy mixture after the concentrating step.

3. The process of claim 1 which further includes the step of adding a coloring agent additive to the concentrated candy mixture after the concentrating step.

4. The process of claim 1 which further includes the step of adding a sour taste agent additive to the concentrated candy mixture after the concentrating step.

* * * * *